UNITED STATES PATENT OFFICE.

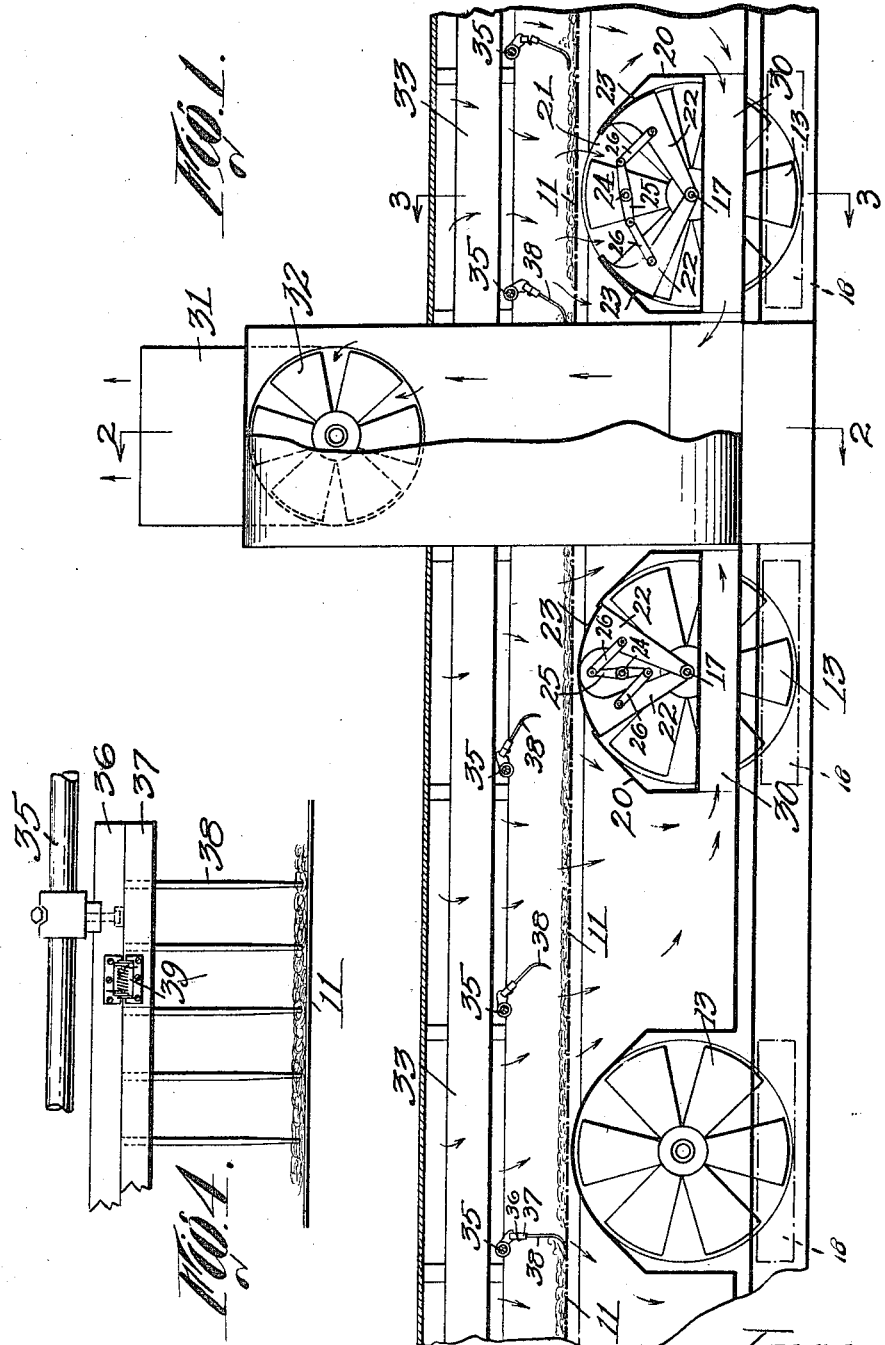

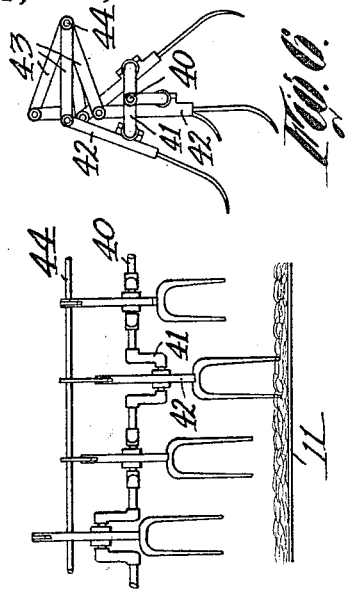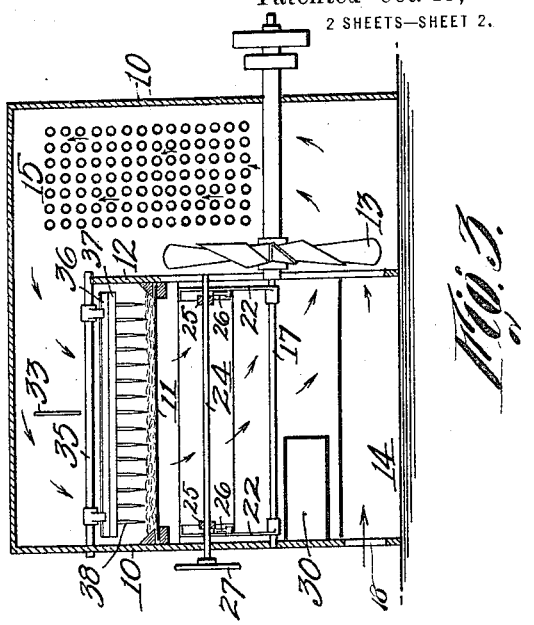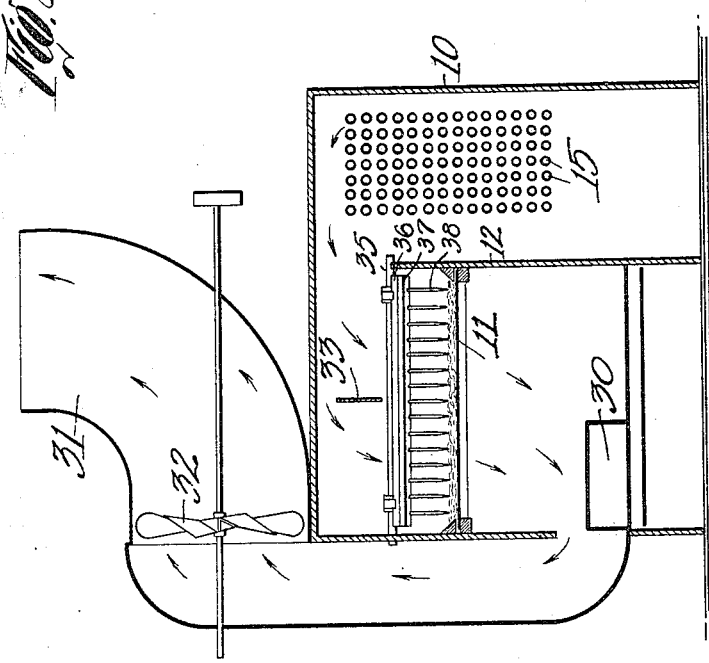

FREDERICK G. SARGENT, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS.

DRYING-MACHINE FOR FIBROUS MATERIALS.

1,281,667.        Specification of Letters Patent.        Patented Oct. 15, 1918.

Application filed December 20, 1917. Serial No. 208,170.

*To all whom it may concern:*

Be it known that I, FREDERICK G. SARGENT, a citizen of the United States, residing at Westford, in the county of Middlesex and State of Massachusetts, have invented a new and useful Drying-Machine for Fibrous Materials, of which the following is a specification.

This invention relates to a drier for use in drying fibrous materials, such as wool, hair and vegetable fiber.

The principal objects of the invention are to provide means whereby the course of air through the drier can be regulated to control its circulation and recirculation, and also control the temperature and moisture of the same; and to provide improved means for controlling the direction of most of the air after it has once passed through the fibers to be dried.

Driers of this type are provided with means for drawing the air through them and past a heating device in their course. It is obvious that the air once being heated by this heating device can be recirculated through it with economy because it does not have to be reheated from the temperature of the external air, but this also presents a disadvantage because such air is laden with moisture that has to be removed, but by providing means whereby the air can be sent through the heating coils or discharged externally at the will of the operator and in a simple and efficient manner these factors can be controlled and this invention relates to that control. The invention also involves improvements in details of construction and combinations of parts as will appear.

Reference is to be had to the accompanying drawings in which—

Figure 1 is a side elevation of a drier constructed in accordance with this invention with parts in longitudinal section;

Fig. 2 is a transverse sectional view on the line 2—2 of Fig. 1;

Fig. 3 is a transverse sectional view on the line 3—3 of Fig. 1;

Fig. 4 is a front elevation of one form of kicker shown in Fig. 1;

Fig. 5 is a similar view of another form of kicker, and

Fig. 6 is an edge view of the same.

The invention is shown as applied to a drier having a casing 10 and provided with a horizontal support 11 for the fibrous material, preferably in the form of a horizontally moving conveyer. It will be understood of course, that the invention can be applied independently of whether there is one of these conveyers or more. This conveyer is supported by a casing or frame 12 inside the casing which does not occupy the full width of the casing, the rest of it being taken up by a series of fans 13 for drawing the air in through inlets 18 from the outside through passages 14 under the casing 12 and by a heating device shown in the form of a series of steam coils 15. These are located in such position that the air coming in through each fan 13 will pass through the heating coils and then in the form illustrated, up over the top of the support or conveyer 11 and down through it and the material located upon it. The part of the device just described is well known in this art and this invention relates to the control of the air after it passes through the fibrous material for the first time.

In Fig. 1 three of the fans 13 are shown all operating to draw in air in the same way and circulate it through the coils and stock. One of them is shown as having no other function than that above described, but the other two are shown as located in interior casings 20, each of which casings has an opening at 21 directly under the conveyer 11 for receiving the air down through the conveyer and directing it of course back through the fan 13 into the drying coils. This casing 20 constitutes a passage inside of the main casing 10 for directing the air from the fiber being dried back into the fan and causing it to be recirculated and reheated.

For the purpose of controlling this operation I have shown the shaft 17 on which the fan 13 is located as constituting a pivotal support for two pairs of swinging frames 22. Each pair of swinging frames 22 supports a curved valve 23 which together are adapted to close the opening 21 as shown in the central casing 20 in Fig. 1, or to open it as shown in the right hand position. For the purpose of operating it a shaft 24 is provided having arms 25 connected with the frames 22 by links 26. This shaft has a hand wheel 27 outside by which it can be oscillated.

It will be noted that there is a passage 30 through each of the casings 20 through which air can pass from one side of the casing to the other and into an outlet stack 31. This latter is provided with a fan 32 for exhausting the air from the drier. A baffle plate 33 shown over the conveyer to separate the currents of air causes them to pass down through the two sides of the conveyer in a uniform manner.

In order to loosen up the material on the conveyer transverse shafts 35 are shown arranged to oscillate and each provided with a fixed cross rod 36 and a hinged cross rod 37 to which a kicker finger 38 is fixed. This form of kicker is shown in my prior application, Serial No. 172,583, but in that case the hinged bar was yieldingly connected with the upper bar so that it could swing back by gravity. In this case I provide springs 39 for assisting the action of gravity in this respect.

Another form of kicker is indicated in Figs. 5 and 6, in which the cross shaft 40 is provided with cranks 41 hinged to kicker members 42. Each of these kicker members is provided with a link 43, all pivoted on a stationary rod 44 so as to modify the action thereof. These several kickers obviously work at various points in the cycle of operations so as to loosen up the stock in an efficient manner.

In operation the air is originally drawn in from the outside through the passages 14 by the fans 13 up through the heating coils, then down through the stock. If the valves of the two casings 20 at the right are open the air will circulate down through these casings and be recirculated by the fans as indicated by the arrows in Fig. 3. However, the fan at the left is not shown as provided with any means for recirculating the air at that point and that air, as well as that coming against any casing 20 in which the valves are closed will pass down two sides of the casing and through the passage 30 from one side, so that all the air comes into the stack 31 and is discharged from the machine.

In this way a most efficient circulating system is secured because it can be controlled to allow as much air as may be desired to be recirculated and its dryness and temperature can be effectively regulated. It will be understood, of course, that while there is a draft from the fan 32 along both sides of the casing 20 when the valves are open, yet the direct draft from the fan 13 is stronger and most of the air will follow that course.

Although I have illustrated and described only two forms of the invention and shown the same as applied to a particular type of drying machine, I am aware of the fact that other modifications can be made in the invention and that it can be applied to other types of drying machines without departing from the scope of the invention as expressed in the claims. Therefore I do not wish to be limited in this respect, but what I do claim is:—

1. In a drying machine, the combination of a casing, means for supporting the stock to be dried in said casing, means for drawing air into the casing from outside and through the stock, means for heating the air, means for exhausting the air from the casing, and adjustable means located in position to receive the air as it passes through the stock and direct it back to the means for drawing in the air.

2. In a drying machine, the combination of a casing, means for supporting the stock to be dried in said casing, intake fans for drawing air into the casing from outside and through the stock, means for heating the air immediately after it is drawn in, means for exhausting the air from the casing, an interior casing or passage located in position to receive the air as it passes through the stock and direct it back to the intake fans, and means for controlling the passage of air through said interior casing.

3. In a drier for fibrous materials, the combination of a support for the material to be dried, heating means in the drier, a series of intake fans for drawing air in from the exterior and directing it through the heating means and toward the material to be dried, casings located concentrically with respect to said fans for receiving the air from the material to be dried, and means for controlling the admission of the air through the casings into the intake fans.

4. In a drier for fibrous materials, the combination of a support for the material to be dried, heating means at one side thereof, means for drawing air in from the exterior and directing it through the heating means and toward the material to be dried, an exhaust, a casing located concentrically with respect to said air drawing means directing the air away from the material to be dried and into the exhaust, and means for opening and closing said casing to admit the air through it into said air drawing means, said casing extending throughout the width of the support for the fibrous material from one side wall of the drier substantially to the air drawing means, and being open at the end toward the same.

5. In a drier for fibrous materials, the combination of a support for the material to be dried, heating means adjacent thereto, a series of intake fans for drawing air in from the exterior and directing it through the heating means and the material to be dried, casings located concentrically with respect to said fans, and means for opening and closing said casings to admit the air through them from the stock into the intake fans, said casings having passages through them longitudinally with respect to the drier for taking the air from one side and directing it through to the other side and into the exhaust.

6. In a drier for fibrous materials, the combination of a support for the material to be dried, heating means at one side thereof, a series of intake fans drawing air in from the exterior and directing it through the heating means and toward the material to be dried, casings located concentrically with respect to said fans, their external surfaces normally directing the air away from the materials to be dried and into the exhaust, means for opening and closing said casings to admit the air through them into the intake fans, said means comprising pivoted valve plates, and means for simultaneously swinging them from or toward each other.

In testimony whereof I have hereunto affixed my signature.

FREDERICK G. SARGENT.

Copies of this patent may be obtained for five cents each, by addressing the "Commissioner of Patents, Washington, D. C."